United States Patent
Ohnishi et al.

(10) Patent No.: US 8,806,699 B2
(45) Date of Patent: Aug. 19, 2014

(54) WIPER DEVICE FOR CLEANING ROOF-LIGHT WINDOW, CAB, AND CONSTRUCTION MACHINE

(71) Applicant: Komatsu Ltd., Tokyo (JP)

(72) Inventors: Gaku Ohnishi, Hirakata (JP); Toshimasa Kanda, Hirakata (JP); Kentarou Watanabe, Hirakata (JP); Atsushi Karami, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/822,422

(22) PCT Filed: Sep. 20, 2012

(86) PCT No.: PCT/JP2012/073973
§ 371 (c)(1),
(2), (4) Date: Mar. 12, 2013

(87) PCT Pub. No.: WO2014/016975
PCT Pub. Date: Jan. 30, 2014

(65) Prior Publication Data
US 2014/0110972 A1    Apr. 24, 2014

(30) Foreign Application Priority Data
Jul. 23, 2012    (JP) ................. 2012-162537

(51) Int. Cl.
*B60S 1/06*    (2006.01)
*B60S 1/18*    (2006.01)
*B60S 1/24*    (2006.01)
*B60S 1/34*    (2006.01)
*E02F 9/16*    (2006.01)

(52) U.S. Cl.
USPC ............... 15/250.3; 15/250.31; 15/250.34

(58) Field of Classification Search
USPC ............ 15/250.3, 250.31, 250.34, 250.001, 15/250.27, 250.21, 250.23; 296/96.15, 296/96.17
See application file for complete search history.

(56) References Cited

U.S. PATENT DOCUMENTS

| | | | |
|---|---|---|---|
| 2,438,305 A * | 3/1948 | Smulski | 15/250.34 |
| 3,788,681 A | 1/1974 | Barenyi et al. | |
| 4,507,711 A * | 3/1985 | Ono et al. | 362/527 |
| 7,610,649 B2 * | 11/2009 | Ohe et al. | 15/250.31 |
| 2006/0070201 A1 * | 4/2006 | Ohe et al. | 15/250.3 |
| 2009/0094774 A1 | 4/2009 | Reith et al. | |

FOREIGN PATENT DOCUMENTS

| | | |
|---|---|---|
| DE | 2114424 | 10/1972 |
| DE | 9313053 U1 | 10/1993 |
| DE | 102005045927 A1 | 4/2006 |

(Continued)

*Primary Examiner* — Gary Graham
(74) *Attorney, Agent, or Firm* — Drinker Biddle & Reath LLP

(57) ABSTRACT

A roof-light window wiper device includes a wiper motor having an output shaft; a wiper link coupled to the output shaft, and having an extension extending in a direction crossing the output shaft of the wiper motor, and a drive shaft extending in a direction crossing the extension, and a wiper connected to the drive shaft. The drive shaft and the output shaft extend at the side of the wiper motor relative to the wiper link. The wiper is connected to the drive shaft at the side of the wiper motor relative to the wiper link. Thus, there can be provided a roof-light window wiper device that can have the pressure of the wiper against the surface of a roof-light window increased by decreasing the depression angle of the wiper, and a cab and a construction machine including the roof-light window wiper device.

5 Claims, 14 Drawing Sheets

(56) References Cited

FOREIGN PATENT DOCUMENTS

| | | |
|---|---|---|
| GB | 765807 | 1/1957 |
| GB | 1012371 A | 12/1965 |
| JP | 5-58759 U | 8/1993 |
| JP | 7-101689 A | 4/1995 |
| JP | 2009-531217 A | 9/2009 |
| JP | 2010-100122 A | 5/2010 |
| JP | 2010-188841 A | 9/2010 |

\* cited by examiner

WIPER DEVICE FOR CLEANING ROOF-LIGHT WINDOW, CAB, AND CONSTRUCTION MACHINE

TECHNICAL FIELD

The present invention relates to a roof-light window wiper device, a cab, and a construction machine. Particularly, the present invention relates to a roof-light window wiper device directed to cleaning a roof-light window, and a cab and a construction machine including the roof-light window wiper device.

BACKGROUND ART

A wiper device provided at the front window of a construction machine generally has a wiper motor arranged in a cab. The output shaft of the wiper motor is connected to the wiper located outside the cab through a through hole formed at the cab wall.

For example, Japanese Patent Laying-Open No. 2010-100122 (PTL 1) discloses a wiper device provided at the front window of a vehicle. The wiper device has a wiper motor arranged inside the vehicle compartment. An output shaft of the wiper motor passes through a through hole formed at the cowl top section to be connected to a wiper member outside the vehicle compartment. Furthermore, a serration section having a diameter becoming smaller towards the tip is provided at the leading end of the output shaft. The wiper member is fixed to the serration section.

CITATION LIST

Patent Literature

PTL 1: Japanese Patent Laying-Open No. 2010-100122

SUMMARY OF INVENTION

Technical Problem

Some construction machines have a roof-light window wiper device provided at the cab to clean a roof-light window. Since the roof-light window wiper device is often attached after the user has bought the construction machine, the task for this attachment should be not difficult. To facilitate the attachment task, it is preferable to arrange the wiper motor outside the cab without having to form a through hole in which an output shaft of the wiper motor is inserted at the cab.

However, if the wiper motor is simply arranged outside the cab, the output shaft of the wiper motor will extend from the top of the wiper motor outwards of the cab. Therefore, the difference in height between the leading end of the output shaft and the surface of the roof-light window becomes larger. Since the wiper is attached to the leading end of the output shaft, the depression angle of the wiper will become larger. Accordingly, the pressure of the wiper against the surface of the roof-light window becomes weaker.

In view of the foregoing, an object of the present invention is to provide a roof-light window wiper device allowing the task of attaching a wiper and a wiper motor to a cab to be facilitated, and increasing the pressure of the wiper against the surface of a roof-light window by decreasing the depression angle of the wiper, and a cab and a construction machine including the roof-light window wiper device.

Solution to Problem

A roof-light window wiper device of the present invention includes: a wiper motor having an output shaft; a wiper link coupled to the output shaft, and having an extension extending in a direction crossing the output shaft of the wiper motor and a drive shaft extending in a direction crossing the extension, and a wiper connected to the drive shaft. The drive shaft and the output shaft extend at a side of the wiper motor relative to the wiper link. The wiper is connected to the drive shaft at the side of the wiper motor relative to the wiper link.

Since the drive shaft and the output shaft extend at the wiper motor side relative to the wiper link while the wiper is connected to the drive shaft at the wiper motor side relative to the wiper link in the roof-light window wiper device of the present invention, the wiper motor and the wiper can be arranged at the same side relative to the wiper link. Accordingly, the difference in height from the leading end of the drive shaft up to the surface of the roof-light window can be reduced, which allows the depression angle of the wiper to be decreased. Therefore, the pressure of the wiper against the surface of the roof-light window can be increased. As used herein, a depression angle refers to the angle of rotation of the retainer with respect to the arm head of the wiper, and the angle relative to a plane parallel to the surface of the roof-light window.

The roof-light window wiper device further includes a coupling device connecting the drive shaft and the wiper. The coupling device includes a coupling member extending in a direction crossing and attached to the drive shaft, and a coupling shaft extending at the side of said extension relative to the coupling member. A coupling shaft is attached to the wiper. Since the drive shaft and the wiper are connected by the coupling device, a damage of the coupling device caused by excessive load on the wiper can be overcome to allow the drive shaft and wiper to be connected again by exchanging the coupling device.

The coupling member extends in a direction crossing the drive shaft, whereas the coupling shaft extending at the side of the extension relative to the coupling member is attached to the wiper. Therefore, even in the case where the wiper motor is arranged such that the output shaft extends outward from the roof-light window, the depression angle of the wiper can be decreased by connecting the drive shaft and the wiper by means of the coupling device.

In the roof-light window wiper device set forth above, the wiper motor is arranged lower than the wiper link. Therefore, the output shaft of the wiper motor is provided so as to extend outward from the roof-light window. The depression angle of the wiper can be decreased even in such a case.

In the roof-light window wiper device set forth above, the wiper motor is arranged upper than the wiper link. Therefore, the wiper motor can be increased in size while the depression angle of the wiper is still decreased. Accordingly, the torque of the wiper motor can be increased while the depression angle of the wiper is still maintained small. Thus, the pressure of the wiper against the surface of the roof-light window can be further increased.

According to a cab for a construction machine of the present invention, the roof-light window wiper device set forth above is attached. Thus, there can be provided a cab that can have the pressure of the wiper against the surface of the roof-light window increased.

A construction machine of the present invention includes the cab set forth above. Therefore, there can be provided a construction machine including a cab that can have the pressure of the wiper against the surface of the roof-light window increased.

Advantageous Effects of Invention

As set forth above, the present invention allows the pressure of the wiper against the surface of the roof-light window to be increased by decreasing the depression angle of the wiper.

DESCRIPTION OF EMBODIMENTS

Embodiments of the present invention will be described hereinafter based on the drawings.

First, a structure of a construction machine according to an embodiment of the present invention will be described. Although a hydraulic excavator will be described as an example of a construction machine to which the concept of the present invention can be applied, the present invention is applicable to any construction machine including a cab with a roof-light window.

Figure 1:
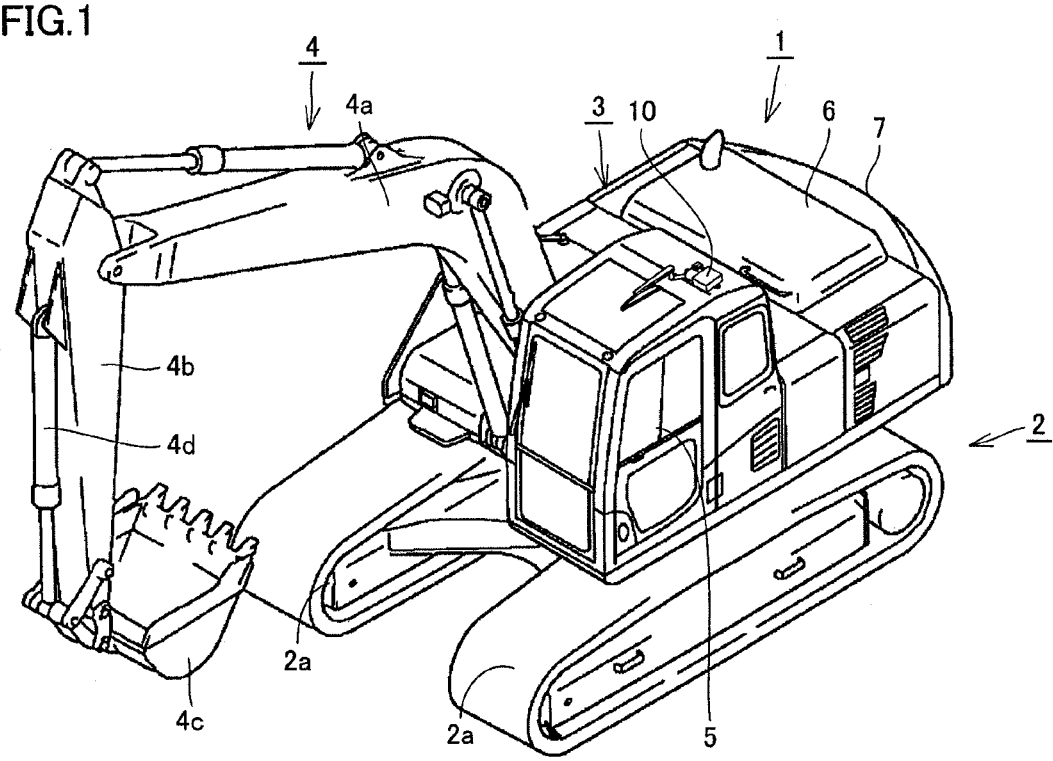
FIG. 1 is a perspective view schematically representing a structure of a hydraulic excavator according to an embodiment of the present invention.

Referring to FIG. 1, a hydraulic excavator 1 mainly includes a lower carrier 2, an upper revolving unit 3, a work implement 4, and a roof-light window wiper device 10. Lower carrier 2 is configured to run autonomously by the rotational driving of left and right crawler belts 2a constituting a pair. Upper revolving unit 3 is installed rotable about lower carrier 2. Work implement 4 is pivotably arranged at the front side of revolving unit 3 to move up and down. Work implement 4 includes a boom 4a, an arm 4b, a bucket 4c, and a hydraulic cylinder 4d.

The aforementioned lower carrier 2 and upper revolving unit 3 mainly constitute the body of the construction machine. Upper revolving unit 3 includes a cab 5 at the front left side (vehicle front side), as well as an engine compartment 6 for housing an engine and a counterweight 7 at the rear side (vehicle back side). In the present embodiment, the front/rear and left/right of the vehicle is based on the operator seated in cab 5 as the reference. Roof-light window wiper device 10 is attached to cab 5.

Figure 2:
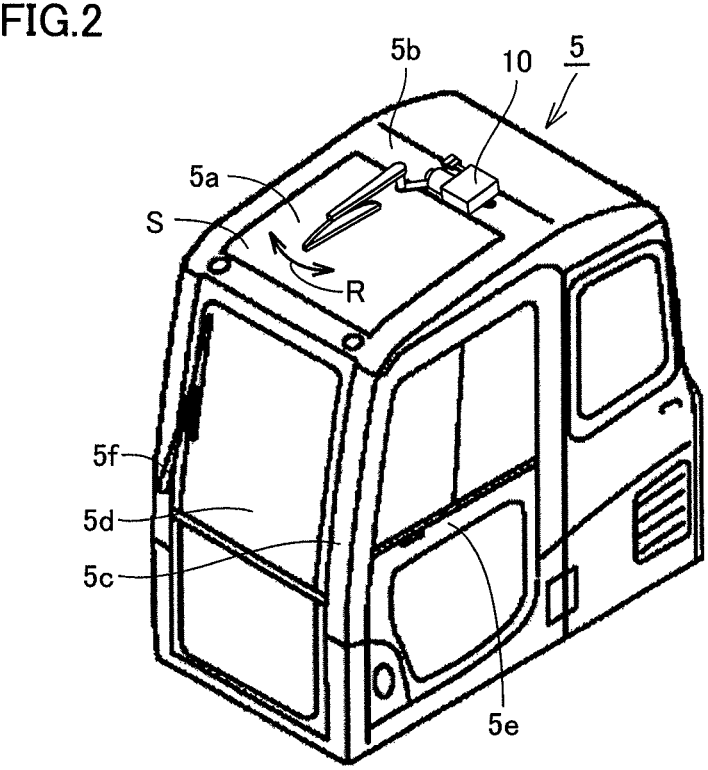
FIG. 2 is an enlarged view of a cab of the hydraulic excavator of FIG. 1.

Referring to FIG. 2, cab 5 includes a roof-light window 5a, a top panel 5b, a pillar 5c, a front window 5d, a door 5e, and a front window wiper 5f. Top panel 5b with roof-light window 5a is located at the roof of cab 5. Roof-light window 5a is arranged at the front side of cab 5.

Pillar 5c extends vertically between the roof and the floor of cab 5, supporting the roof section relative to the floor section. Front window 5d is located at the front side of cab 5 between pillars 5c. At the left side of cab 5, door 5e is arranged between pillars 5c. Front window wiper 5f is supported by pillar 5c in a manner allowing the surface of front window 5d to be cleaned. Roof-light window wiper device 10 is attached to top panel 5b to allow cleaning of roof-light window 5a. Roof-light window wiper device 10 is configured such that a wiper 13 that will be described afterwards wipes a surface S of roof-light window 5a by pivoting in the direction of arrow R in the drawing.

A structure of roof-light window wiper device 10 of the present embodiment will be described in detail hereinafter.

Figure 3:
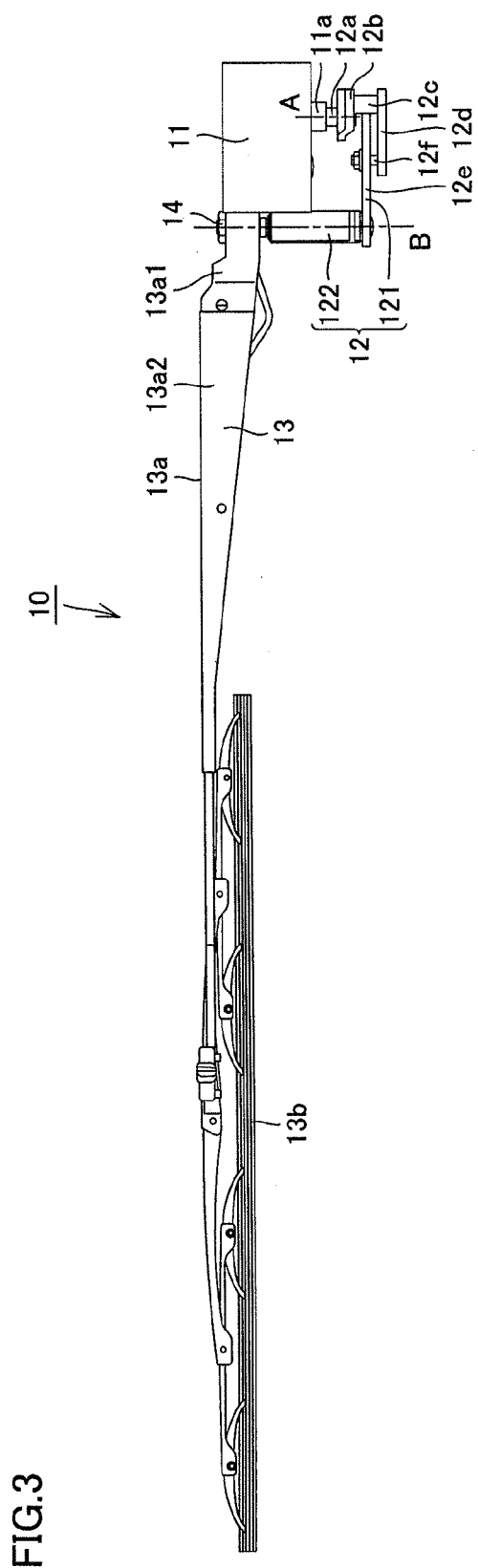
FIG. 3 is a side view schematically representing a structure of a roof-light window wiper device according to an embodiment of the present invention.
Figure 4:
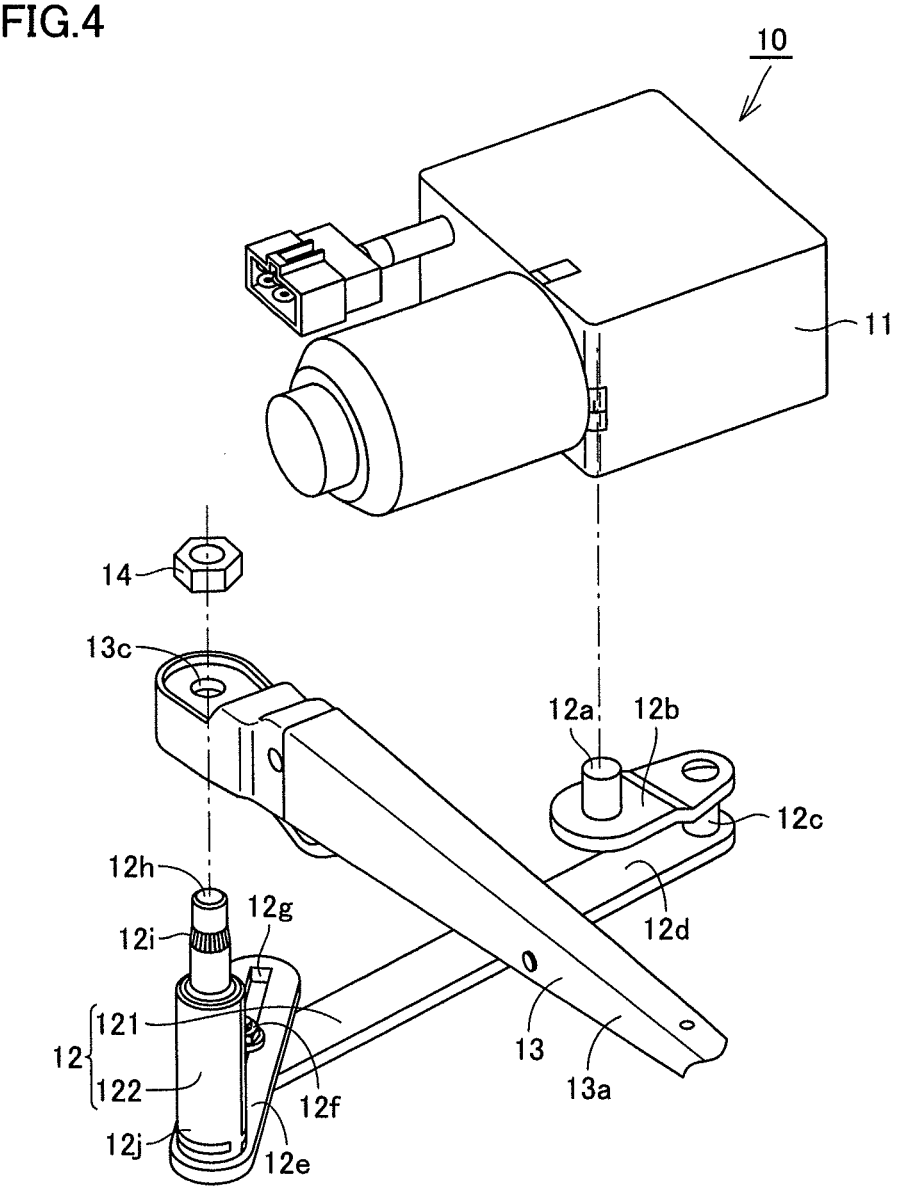
FIG. 4 is an exploded perspective view schematically representing a structure of a roof-light window wiper device according to an embodiment of the present invention.
Figure 5:
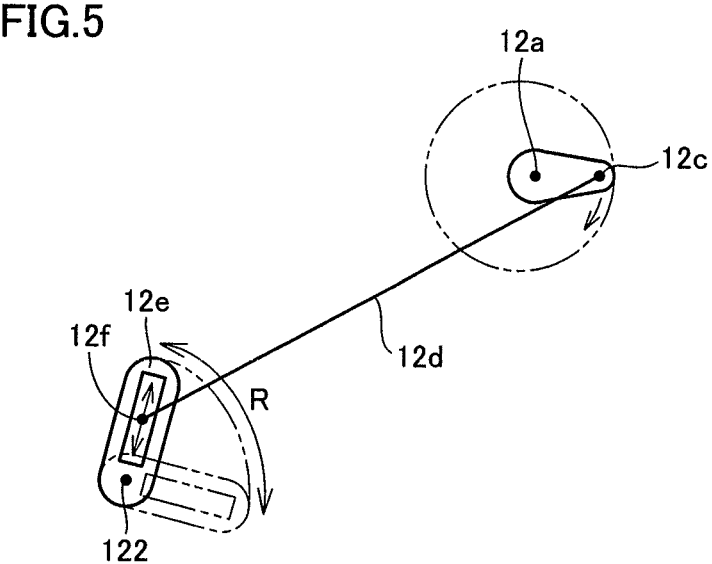
FIG. 5 schematically represents an operation of a roof-light window wiper device according to an embodiment of the present invention.

Referring to FIGS. 3-5, roof-light window wiper device 10 mainly includes a wiper motor 11, a wiper link 12, and a wiper 13.

Referring mainly to FIG. 3, wiper motor 11 includes an output shaft 11a that rotates about an axis A. Output shaft 11a is formed to extend outward of wiper motor 11. Output shaft 11a is arranged at the bottom face of wiper motor 11. Wiper motor 11 is arranged at an upper side relative to wiper link 12.

Wiper link 12 is coupled to output shaft 11a at a connection projection 12a that will be described afterwards. Wiper link 12 includes an extension 121 and a drive shaft 122. Extension 121 extends in a direction crossing output shaft 11a perpendicularly. Drive shaft 122 extends in a direction crossing extension 121 perpendicularly. Drive shaft 122 and output shaft 11a extend at the side of wiper motor 11 relative to wiper link 12. Drive shaft 122 and output shaft 11a are arranged in parallel. Referring mainly to FIG. 5, wiper link 12 causes drive shaft 122 to rotate by the rotation of output shaft 11a.

Referring mainly to FIG. 4, extension 121 includes a connection projection 12a, a first extension 12b, a connection shaft 12c, a second extension 12d, a third extension 12e, a connection member 12f, and a connection groove 12g. Connection projection 12a extends in a direction along output shaft 11a. Connection projection 12a is connected to output shaft 11a. First extension 12b extends in a direction crossing connection projection 12a. First extension 12b has connection projection 12a arranged at the upper side of one end, and has connection shaft 12c supported rotatably at the lower side of the other end. Connection projection 12a and connection shaft 12c extend in a direction opposite to each other with first extension 12b therebetween. As used herein, the upper side and lower side imply the upper side and lower side under the state where the wiper device is attached to the construction machine.

Second extension 12d extends in a direction crossing connection projection 12a. Second extension 12d has connection shaft 12c arranged at one end, and third extension 12e attached at the other end by connection member 12f. Connection shaft 12c and connection member 12f extend in the same direction from second extension 12d. Connection member 12f is inserted along connection groove 12g of third extension 12e. Third extension 12e is formed swingable with respect to second extension 12d by connection member 12f sliding along connection groove 12g. At the upper side of one end of third extension 12e, drive shaft 122 is provided in a direction along output shaft 11a of wiper motor 11.

Drive shaft 122 includes a leading end 12h, a serration section 12i, and a shaft body 12j. Leading end 12h is provided at the leading end of drive shaft 122. Serration section 12i is provided between leading end 12h and shaft body 12j. Serration section 12i is formed such that the diameter becomes smaller towards leading end 12h. Serration section 12i includes a plurality of grooves formed linearly in the direction in which drive shaft 122 extends. Shaft body 12j is arranged at one end of third extension 12e. Shaft body 12j is arranged lower than leading end 12h. Drive shaft 122 rotates about an axis B to cause connected wiper 13 to sway.

Referring mainly to FIGS. 3 and 4, wiper 13 is connected to drive shaft 122. Wiper 13 is connected to drive shaft 122 at the side of wiper motor 11 relative to wiper link 12. Wiper 13 includes a wiper arm 13a, a wiper blade 13b, and a through hole 13c. Wiper arm 13a includes an arm head 13a1, and a retainer 13a2. Retainer 13a2 is connected to one end of arm head 13a1. Wiper blade 13b is connected to the leading end of retainer 13a2. Through hole 13c is provided at the other end of arm head 13a1. Drive shaft 122 is inserted in through hole 13c. A fixture 14 is attached to leading end 12h of drive shaft 122.

Figure 6:
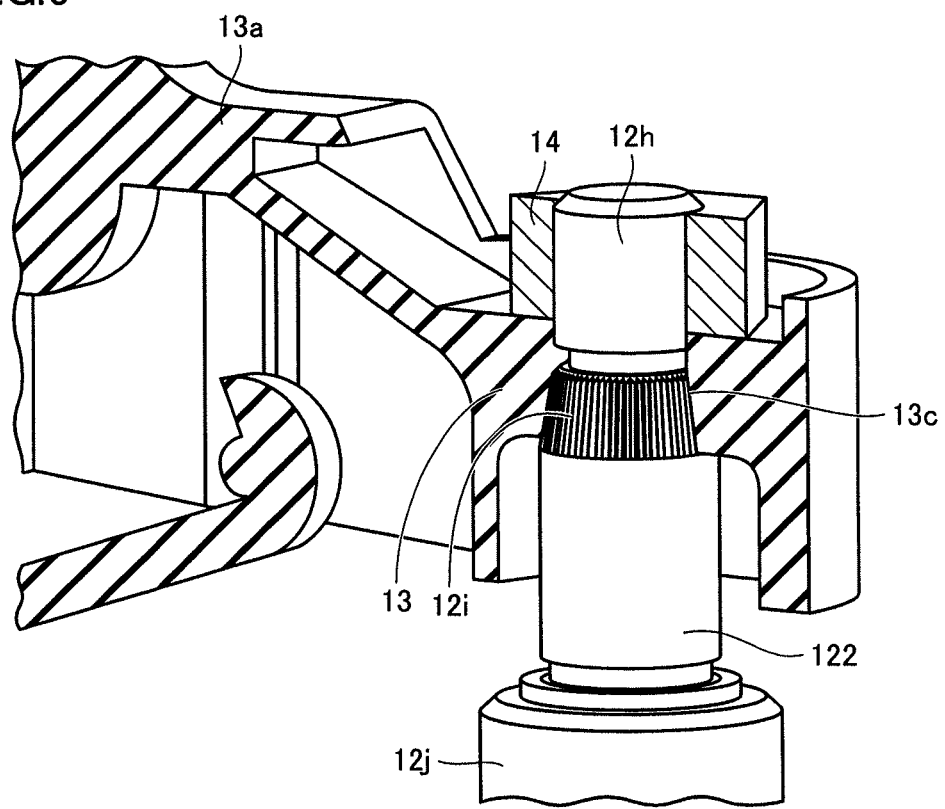
FIG. 6 is a partial sectional view schematically representing a structure of a connecting section between a wiper and a drive shaft of a roof-light window wiper device according to an embodiment of the present invention.

Referring to FIG. 6, fixture 14 attached at leading end 12h is arranged at the side opposite to shaft body 12j relative to through hole 13c under the state where drive shaft 122 is inserted in through hole 13c of wiper 13. Through hole 13c of wiper 13 includes a section where the diameter becomes larger towards shaft body 12j of drive shaft 122. Serration section 12i is fitted in through hole 13c of wiper 13. Serration section 12i and through hole 13c mesh with each other to be fixed. Serration section 12i has a sawtooth section protruding outwards. The sawtooth section is formed along the entire perimeter of serration section 12i.

Figure 7:
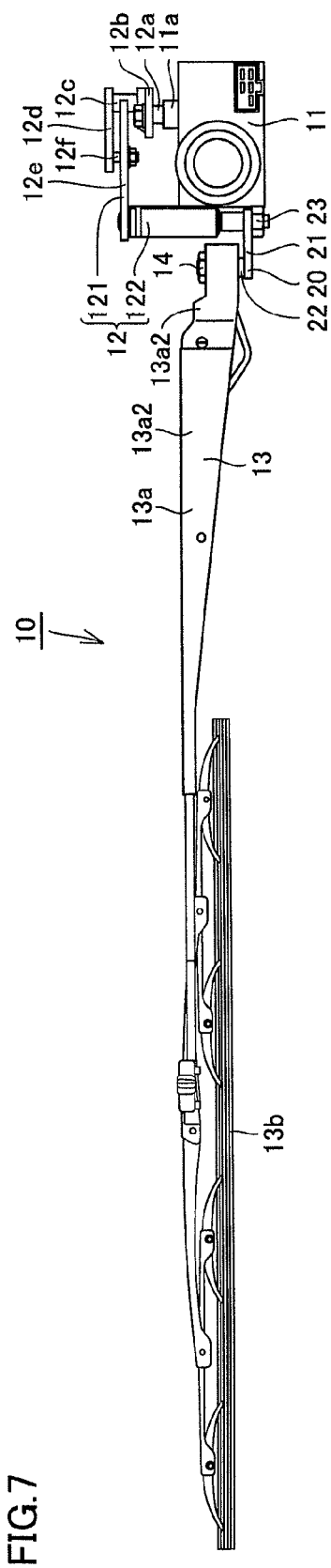
FIG. 7 is a side view schematically representing a structure of a roof-light window wiper device according to a modification of an embodiment of the present invention.
Figure 8:
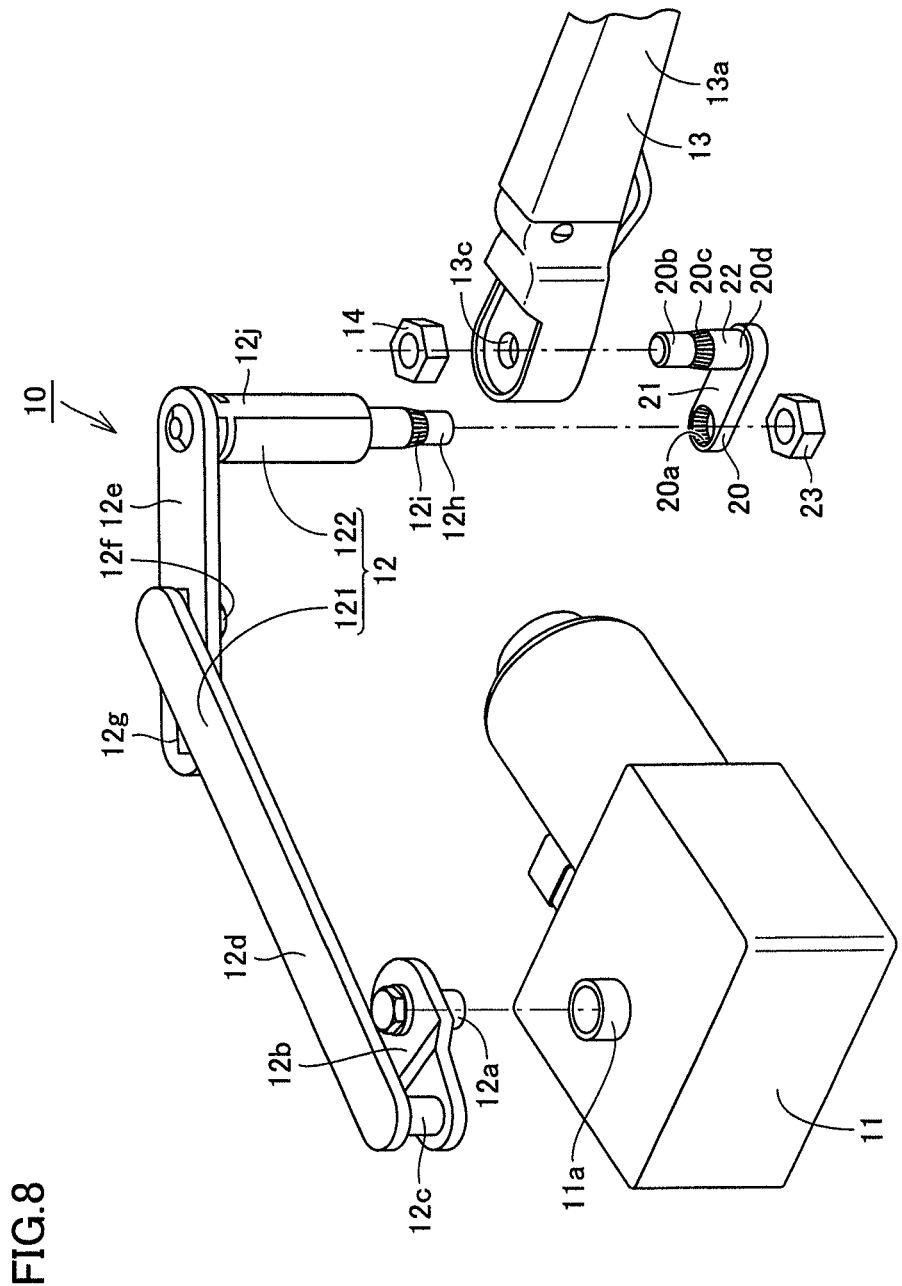
FIG. 8 is an exploded perspective view schematically representing a structure of a roof-light window wiper device according to a modification of an embodiment of the present invention.

Referring to FIGS. 7 and 8, a structure of roof-light window wiper device 10 according to a modification of the present embodiment will be described. Elements identical to those of the present embodiment set forth above have, unless stated otherwise, the same reference characters allotted, and description thereof will not be repeated.

Referring mainly to FIG. 7, roof-light window wiper device 10 of the present modification has output shaft 11a of wiper motor 11 arranged at the top face of wiper motor 11. Wiper motor 11 is arranged lower than wiper link 12. Shaft body 12j of drive shaft 122 is arranged upper than leading end 12h.

Referring mainly to FIGS. 7 and 8, roof-light window wiper device 10 of the present modification further includes a coupling device 20 connecting drive shaft 122 and wiper 13. Coupling device 20 includes a coupling member 21, and a coupling shaft 22. Coupling member 21 extends in a direction crossing drive shaft 122. Coupling member 21 is attached to drive shaft 122. Coupling shaft 22 extends at the side of extension 121 relative to coupling member 21. Coupling shaft 22 is attached to wiper 13. Coupling shaft 22 and drive shaft 122 are arranged in parallel.

Coupling member 21 has a through hole 20a at one end. Through hole 20a of coupling member 21 is formed such that the diameter becomes larger towards shaft body 12j of drive shaft 122. Coupling shaft 22 includes a leading end 20b, a serration section 20c, and a shaft body 20d. Leading end 20b is provided at the tip of coupling shaft 22. Serration section 20c is provided between leading end 20b and shaft body 20d. Serration section 20c is formed such that the diameter becomes smaller towards leading end 20b. Serration section 20c includes a plurality of grooves formed linearly in the direction in which coupling shaft 22 extends. Shaft body 20d is arranged at the other end of coupling member 21.

Leading end 12h of drive shaft 122 is inserted in through hole 20a of coupling member 21. A fixture 23 is attached at leading end 12h of drive shaft 122. Coupling shaft 22 is inserted into through hole 13c of wiper 13. A fixture 14 is attached to leading end 20b of coupling shaft 22.

Figure 9:
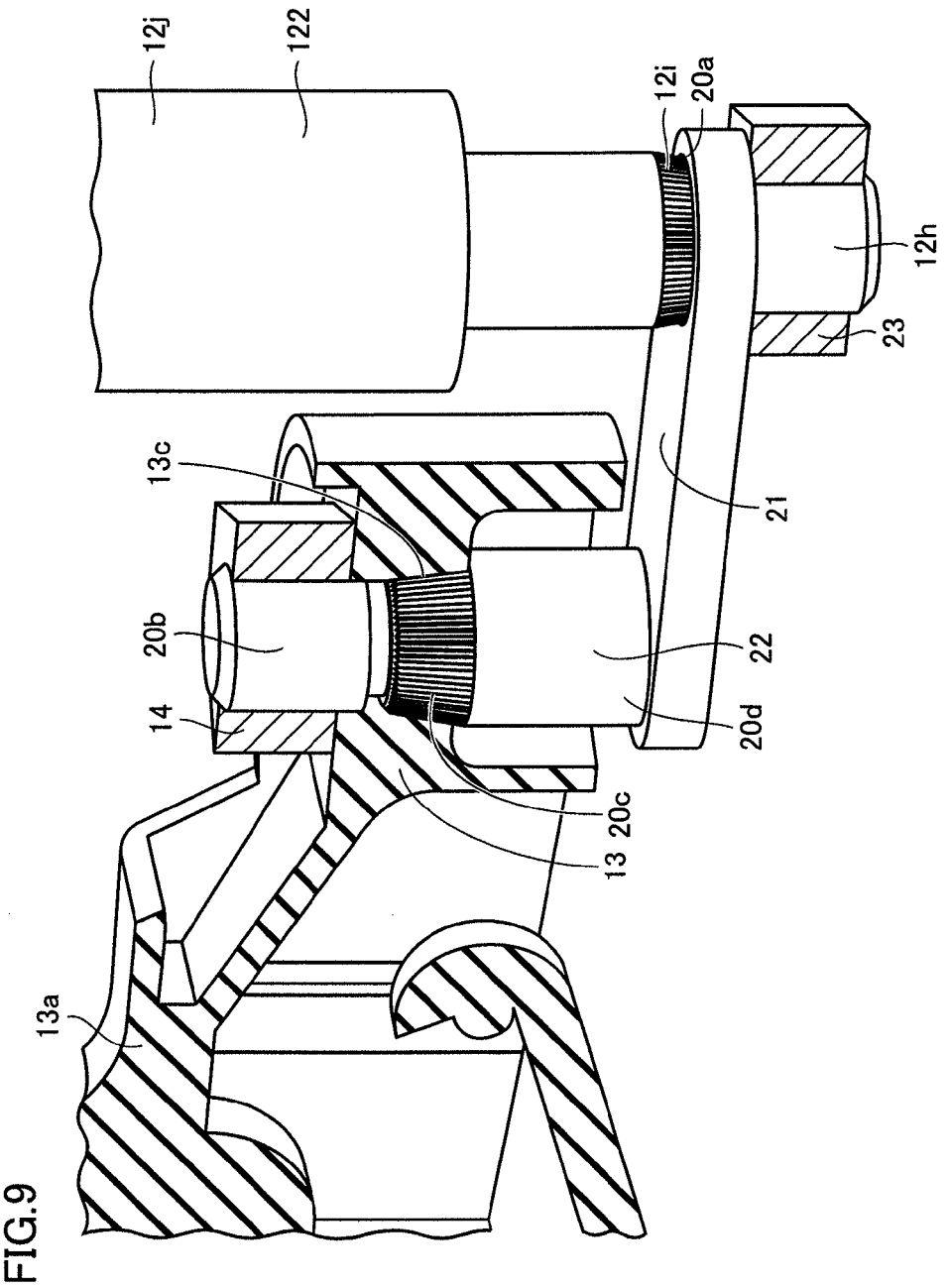
FIG. 9 is a partial sectional view schematically representing a structure of a wiper and a drive shaft connected by a coupling device in a roof-light window wiper device according to an embodiment of the present invention.

Referring to FIG. 9, fixture 23 attached at leading end 12h is arranged at the side opposite to shaft body 12j relative to through hole 20a under the state where drive shaft 122 is inserted in through hole 20a of coupling member 21. Furthermore, serration section 12i is fitted in through hole 20a of coupling member 21. Serration section 12i and through hole 20a mesh with each other to be fixed.

Under the state where coupling shaft 22 is inserted into through hole 13c of wiper 13, fixture 14 attached at leading end 20b is arranged at the side opposite to shaft body 20d relative to through hole 13c. Serration section 20c is fitted in through hole 13c of wiper 13. Serration section 20c and through hole 13c mesh with each other to be fixed. Serration section 20c has a sawtooth section protruding outwards, similar to serration section 12i of drive shaft 122.

By the structure set forth above, the rotation of output shaft 11a of wiper motor 11 is converted into a swaying motion by wiper link 12 to cause wiper 13 to be driven. Wiper motor 11 and wiper 13 are both arranged upper than wiper link 12.

The advantage of the present invention will be described hereinafter in comparison with a comparative example.

Figure 10:
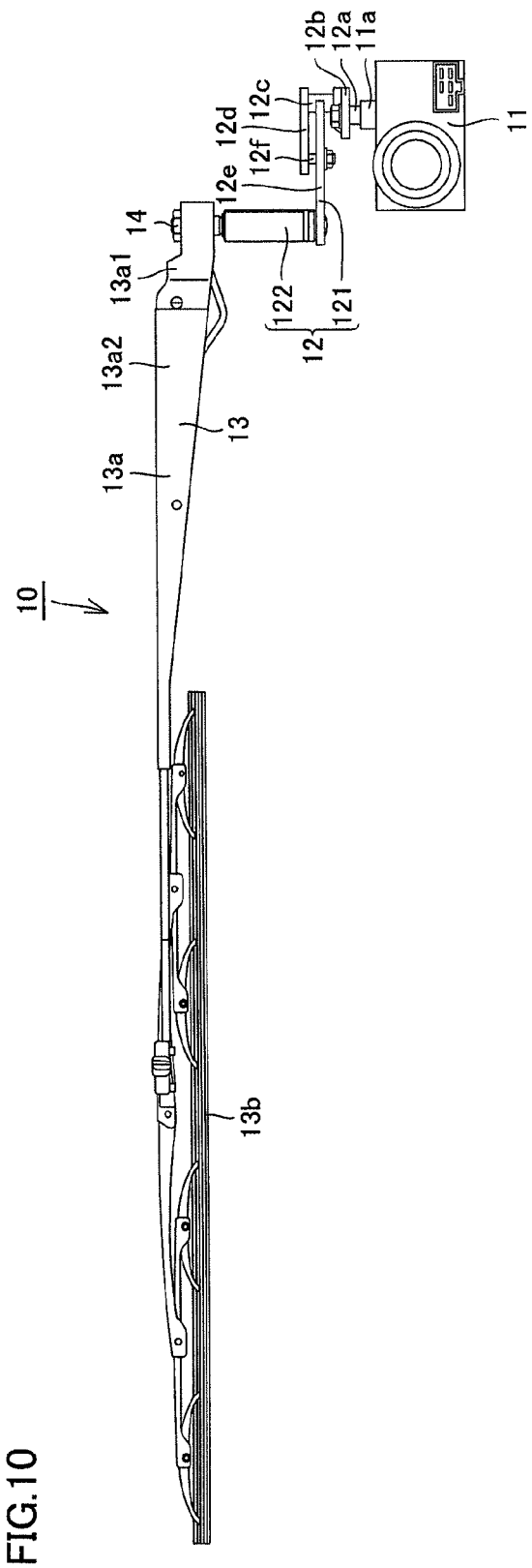
FIG. 10 is a side view schematically representing a configuration of a roof-light window wiper device of a comparative example.
Figure 11:
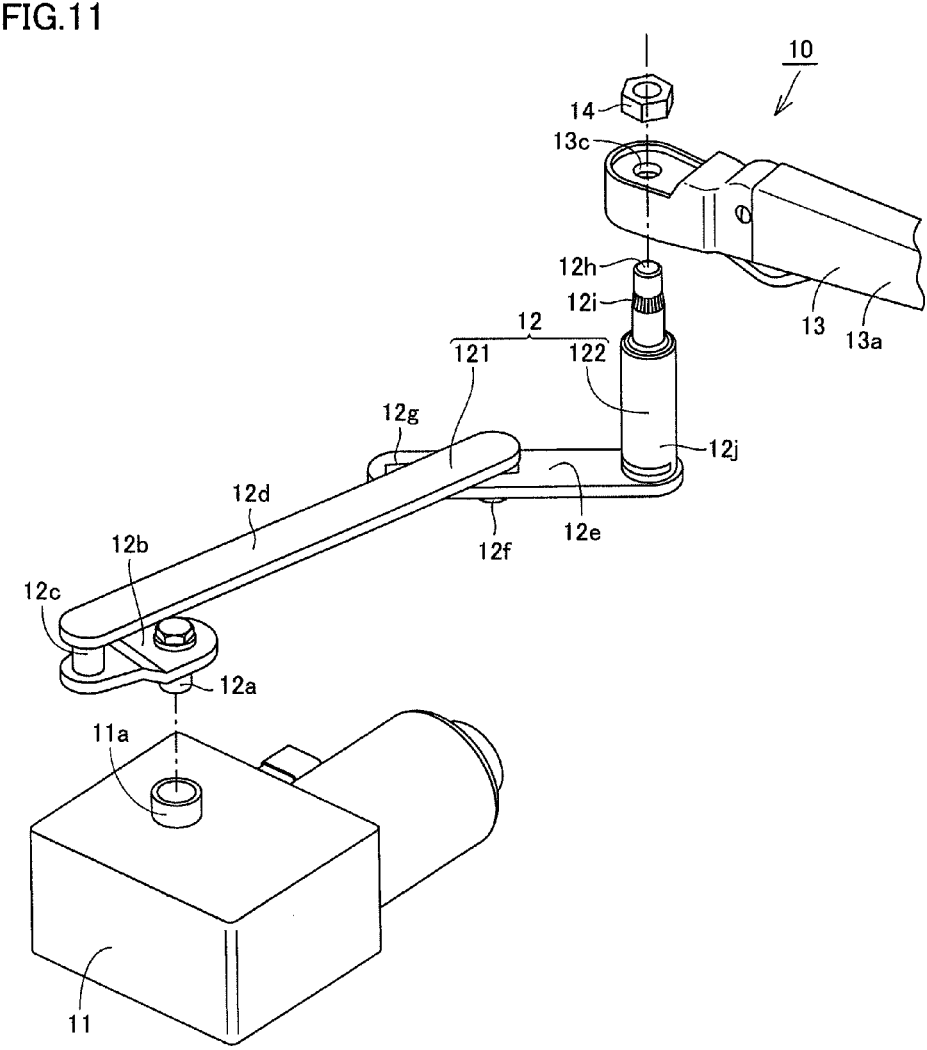
FIG. 11 is an exploded perspective view schematically representing a structure of a roof-light window wiper device of a comparative example.

Referring to FIGS. 10 and 11, a structure of roof-light window wiper device 10 according to a comparative example will be described. Elements identical to those of the present embodiment set forth above have, unless stated otherwise, the same reference characters allotted, and description thereof will not be repeated.

At roof-light window wiper device 10 of the comparative example, output shaft 11a and drive shaft 122 are arranged at opposite sides relative to wiper link 12. Therefore, wiper 13 is arranged at the upper side relative to the height corresponding to the combined length of output shaft 11a and drive shaft 122. Therefore, the distance in the height direction between wiper motor 11 and arm head 13a1 (difference in height) is increased.

Depression angle A of roof-light window wiper device 10 according to a comparative example, embodiment, and modification will be described hereinafter.

Figure 12:
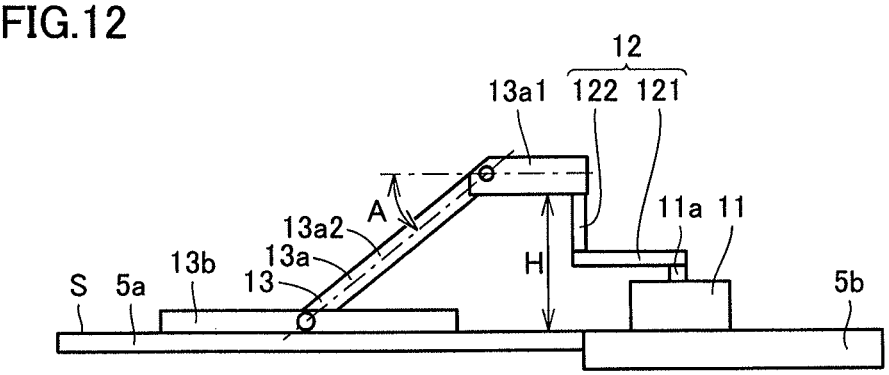
FIG. 12 is a side view schematically representing a roof-light window wiper device of a comparative example.

As shown in FIGS. 10 and 12, roof-light window wiper device 10 of the comparative example has a great difference in height between arm head 13a1 and the surface of roof-light window 5a. Therefore, depression angle A becomes great.

Figure 13:
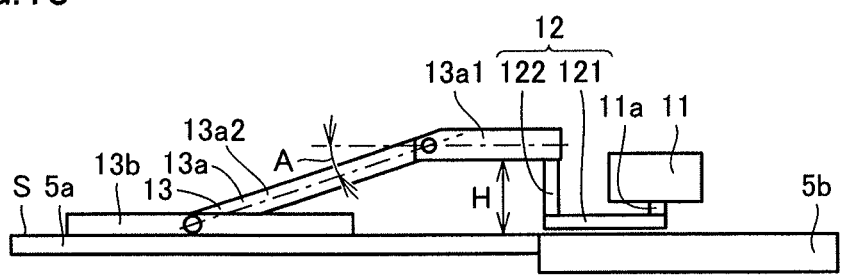
FIG. 13 is a side view schematically representing a roof-light window wiper device according to an embodiment of the present invention.

According to roof-light window wiper device 10 of the present embodiment shown in FIGS. 3 and 13, drive shaft 122 and output shaft 11a extend at the side of wiper motor 11 relative to wiper link 12, and wiper 13 is connected to drive shaft 122 at the side of wiper motor 11 relative to wiper link 12. Therefore, wiper motor 11 and wiper 13 can be arranged at the same side relative to wiper link 12. Therefore, the difference in height between the leading end of drive shaft 122 and surface S of roof-light window 5a can be reduced. Arm head 13a1 is attached at the leading end of drive shaft 122. Accordingly, depression angle A of wiper 13 (the angle of rotation of retainer 13a2 to arm head 13a1 of wiper 13, i.e. the angle to a plane parallel to surface S of roof-light window 5a) can be decreased. Thus, the pressure of wiper 13 against surface S of roof-light window 5a can be increased.

Since wiper motor 11 is arranged upper than wiper link 12 in roof-light window wiper device 10 of the present embodiment, wiper motor 11 can be increased in size while depression angle A of wiper 13 is still small. Accordingly, the torque of wiper motor 11 can be increased while maintaining a small depression angle A of wiper 13. Thus, the pressure of wiper 13 against surface S of roof-light window 5a can be further increased.

Figure 14:
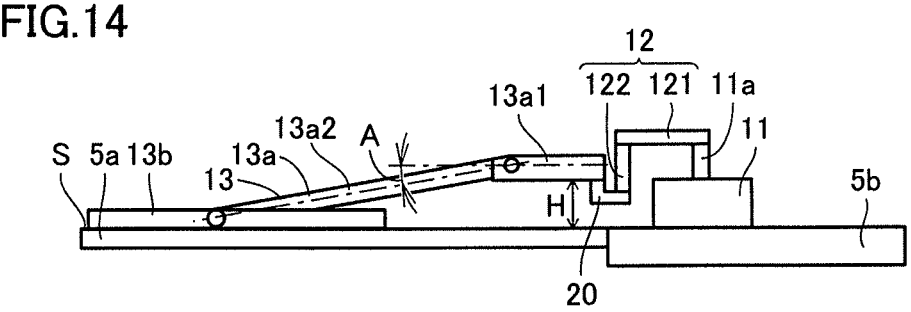
FIG. 14 is a side view schematically representing a roof-light window wiper device according to a modification of an embodiment of the present invention.

As shown in FIGS. 7 and 14, since drive shaft 122 and wiper 13 are connected by a coupling device 20 according to roof-light window wiper device 10 of the modification of the present embodiment, any damage of coupling device 20 caused by excessive load on wiper 13 can be overcome to have drive shaft 122 connected again with wiper 13 by exchanging coupling device 20.

Coupling member 21 extends in a direction crossing drive shaft 122, and coupling shaft 22 extending at the side of extension 121 relative to coupling member 21 is attached to wiper 13. Therefore, even in the case where wiper motor 11 is arranged such that output shaft 11a extends outward from roof-light window 5a, depression angle A of wiper 13 can be decreased by connecting drive shaft 122 and wiper 13 by coupling device 20.

Further, since wiper motor 11 is arranged lower than wiper link 12 according to roof-light window wiper device 10 of the modification of the present embodiment, output shaft 11a of wiper motor 11 is provided to extend outwards from roof-light window 5a. Depression angle A of wiper 13 can be decreased even in such a case.

Referring to FIGS. 1 and 2 again, a cab of the present embodiment has roof-light window wiper device 10 attached at top panel 5b. Thus, there can be provided a cab 5 that can have the pressure of wiper 13 against surface S of roof-light window 5a increased.

A construction machine (hydraulic excavator) 1 of the present embodiment includes cab 5 set forth above. Thus, there can be provided a construction machine (hydraulic excavator) 1 including a cab 5 that can have the pressure of wiper 13 against surface S of roof-light window 5a increased.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

INDUSTRIAL APPLICABILITY

The present invention is advantageously applicable to a roof-light window wiper device directed to cleaning a roof-light window, and a cab and a construction machine including the roof-light window wiper device.

REFERENCE SIGNS LIST 1 hydraulic excavator; 2 lower carrier; 2a crawler belt; 3 upper revolving unit; 4 work implement; 4a boom; 4b arm; 4c bucket; 4d hydraulic cylinder; 5 cab; 5a roof-light window; 5b top panel; 5c pillar; 5d front window; 5e door; 5f front window wiper; 6 engine compartment; 7 counter weight; 10 roof-light window wiper device; 11 wiper motor; 11a output shaft; 12 wiper link; 12a connection projection; 12b first extension; 12c connection shaft; 12d second extension; 12e third extension; 12f connection member; 12g connection groove; 12h, 20b leading end; 12i, 20c serration section; 12j, 20d shaft body; 13 wiper; 13a wiper arm; 13a1 arm head; 13a2 retainer; 13b wiper blade; 13c, 20a through hole; 14, 23 fixture; 20 coupling device; 21 coupling member; 22 coupling shaft; 121 extension; 122 drive shaft; A depression angle; S surface.

The invention claimed is:

1. A roof-light window wiper device comprising:
a wiper motor including an output shaft,
a wiper link coupled to said output shaft, and including an extension extending in a direction crossing said output shaft of said wiper motor and a drive shaft extending in a direction crossing said extension,
a wiper connected to said drive shaft, and
a coupling device connecting said drive shaft and said wiper,
said drive shaft and said output shaft extending at a side of said wiper motor relative to said extension,
said wiper being connected to said drive shaft at the side of said wiper motor relative to said extension,
said coupling device including
a coupling member extending in a direction crossing said drive shaft, and attached to said drive shaft, and
a coupling shaft extending at a side of said extension relative to said coupling member,
said coupling shaft being attached to said wiper.

2. The roof-light window wiper device according to claim 1, wherein said wiper motor is arranged lower than said wiper link.

3. The roof-light window wiper device according to claim 1, wherein said wiper motor is arranged upper than said wiper link.

4. A cab of a construction machine, having the roof-light window wiper device defined in claim 1 attached.

5. A construction machine comprising the cab of a construction machine defined in claim 4.

* * * * *